United States Patent Office 3,344,105
Patented Sept. 26, 1967

3,344,105
EPDM RUBBER COMPATIBLE IN CURE WITH DIENE RUBBERS
Everett T. McDonel, Brecksville, and Parviz Hamed, Akron, Ohio, assignors to The B. F. Goodrich Company, New York, N.Y., a corporation of New York
No Drawing. Filed Sept. 29, 1965, Ser. No. 491,417
3 Claims. (Cl. 260—33.6)

This invention relates to novel compounds suitable for use as tiegums or cements between highly saturated, sulfur curable ethylene-propylene-diene terpolymer elastomers and highly unsaturated diene rubbers. The novel compounds are completely compatible in cure with both the highly saturated and unsaturated materials, which in turn, are incompatible in cure with each other.

Any synthetic elastomer is of interest to the manufacturer of molded, extruded and cast articles made traditionally from natural rubber or any of the synthetic substitutes and alternative materials for natural rubber which have been developed in recent years. Elastomers currently receiving much attention, particularly because of their potential low cost and high resistance to weather, age, heat and ozone, are the terpolymers of ethylene-proylene and a straight chain or cyclic diolefinic material, the manufacture of which is disclosed in United States patents including 2,933,480 and 3,000,866. These ethylene-propylene-diene terpolymers are currently identified as EPDM rubbers in the ASTM designation D1418–56T.

While it is desirable to be able to build composite articles from EPDM rubbers only, it is most likely that, in order to obtain the best balance of properties, and to overcome lack of tack in EPDM rubber in construction and cure, that many manufactured articles will be made from combinations of EPDM rubbers with SBR rubbers, natural rubber and synthetic polyisoprene and polybutadiene. For an article to made incorporating any two or more of these materials, the rubbers must be compatible in cure. EPDM rubbers are not compatible in any cure system with highly unsaturated diene rubbers, NR and SBR, except a peroxide cure, but peroxide cures have limited application with diene rubber stocks because of high cost, odors, lower development of cured properties, and sensitivity to loading with fillers and other pigments.

A novel composition has now been discovered which is completely compatible in cure with saturated EPDM rubbers and with unsaturated diene rubbers, either natural or synthetic. In solid form this novel composition can be employed as a tiegum between an EPDM stock and SBR or NR stock. Dissolved in any hydrocarbon solvent, aliphatic and aromatic solvents such as benzene, toluene, naphtha, carbon tetrachloride, trichloroethylene, hexane and trichloroethane all serve well, a cement is formed which will adhere an EPDM stock to an NR or SBR stock after the different stocks are adhered and cured together, with both the EPDM and the diene rubber employing their standard sulfur-accelerator cure systems.

The invention is accomplished by forming as a novel composition, a blend of diene rubber polymer and, optionally, an EPDM polymer, plus an acrylic material, an organic peroxide and carbon black. This composition is placed, as a solid tiegum or a liquid solvent cement, between the interfaces of an EPDM rubber and an unsaturated diene rubber. The composition is cured in place, as the rubber components are cured, and a high degree of adhesion of novel composition to EPDM and of novel composition to unsaturated diene rubber are simultaneously obtained.

The EPDM rubbers may be made by methods disclosed in the patents listed above. They possess 50 to 70 mol percent ethylene, 1 to 3 mol percent diene, and dilute solution viscosity, DSV, of 1.4 to 2.5.

Unsaturated diene rubbers include natural rubber, styrene-butadiene rubber, cis-polybutadiene and synthetic cis-polyisoprene.

The acrylic material may be selected from acrylic acid, methacrylic acid, alkyl acrylate and methacrylate esters, preferably those containing an alkyl group having 1 to 12 carbon atoms, and metal salts of acrylic acid and methacrylic acid. Preferred metal salts are those of zinc, cadmium, calcium, magnesium, sodium, and aluminum. The most preferred metal salt is zinc acrylate.

The organic peroxide is any organic peroxide that does not decompose below vulcanizing temperatures of 100° F. to 212° F. Dicumyl peroxide, benzoyl peroxide, di-tert.-butyl peroxide, methylethyl ketone peroxide, and di-isopropyl peroxide may be used.

The elastomer blend in the composition of the invention is 50% to 100% unsaturated diene rubber and 0% to 50% EPDM rubber, preferably 80% to 90% natural rubber, by weight There are also added 50 to 80 phr. reinforcing carbon black, preferably 60 to 70 phr., and 5 to 10 phr. zinc oxide, 2 to 12 phr. acrylic material, 1 to 5 phr. organic peroxide.

The composition is formed by blending the solid components on a mill and mixing thoroughly at 150° F. to 212° F. The batch may be sheeted off the mill in thicknesses of 0.020" to 0.030" and used directly as a tiegum. If preferred, the composition may be removed from the mill and dissolved in a hydrocarbon solvent, for example, 50 parts toluene/50 parts trichloroethylene, and formed into a solvent cement.

Use of the composition of the invention to adhere EPDM rubber to unsaturated diene rubber results in a high level of tack being obtained. An example is the construction of a tire using EPDM tread on SBR carcass stock.

The invention is illustrated by the following example where parts are given as parts by weight.

EXAMPLE

| Material | Parts | |
|---|---|---|
| | A | B (control) |
| EPDM polymer, 65 mol percent ethylene, 2.5 mol percent diene, DSV 2.3 | 25 | 25 |
| Natural rubber (smoked sheet) | 75 | 75 |
| Carbon black | 70 | 70 |
| Zinc oxide | 3 | 3 |
| Stearic acid | 1.5 | 1.5 |
| Aromatic processing oil | 15.0 | 15.0 |
| Dicumyl peroxide | 3.5 | 3.5 |
| Zinc acrylate | 3.0 | |

After these materials are thoroughly mixed on the mill, they are dissolved in a 50/50 mixture of toluene/trichloroethylene, and adjusted to 10% total solids. The cements are coated on EPDM tread stock, the same polymer as in the cement, and an SBR/NR blend carcass stock containing 60 parts SBR, 40 parts NR, plus sulfur, accelerators, reinforcement pigment, lubricants and activators to develop the best properties in the unsaturated diene rubbers upon cure. The cement is allowed to dry until solvent has evaporated, then the cemented surfaces are pressed together and cured 60 minutes at 302° F. under 200 p.s.i.

The sample is tested for static cured adhesion by a 180°, 10 inch per minute pull in an Instron tensile testing machine.

| Test Results, lbs. per inch width | A | B |
|---|---|---|
| Room temp | 85 | *50c+s |
| Aged 3 days at 212° F., pulled at 212° F | 35 | 18c+s |

* c—failed in cement line.
  s—failed in diene rubber stock.

Both A samples failed in the SBR/NR stock and not at the cement line.

We claim:

1. An adhesive composition for bonding EPDM rubbers to unsaturated diene rubbers comprising a blend of 50 to 100 parts unsaturated diene rubber selected from the group consisting of natural rubber, styrene-butadiene rubber, cis-polybutadiene and cis-polyisoprene and 0 to 50 parts EPDM polymer, 50 to 80 phr. carbon black, 5 to 10 phr. zinc oxide, 1 to 5 phr. organic peroxide selected from the class comprising those organic peroxides that decompose above 100° F., and 2 to 12 phr. acrylic monomer selected from the class consisting of acrylic acid, methacrylic acid, alkyl acrylates and methacrylates containing alkyl groups having 1 to 12 carbon atoms, and metal salts of acrylic acid and methacrylic acid, said metal salts being selected from the group consisting of zinc, cadmium, calcium, magnesium, sodium, and aluminum.

2. The adhesive composition of claim 1 wherein the acrylic material is zinc acrylate.

3. The adhesive composition of claim 1 wherein said composition is dissolved in a hydrocarbon solvent to form a tiegum cement.

References Cited

Skeist, Handbook of Adhesives, Rheinhold Publishing Corp., New York, 1962, pages 255–267 relied on.

MORRIS LIEBMAN, *Primary Examiner.*

S. L. FOX, *Assistant Examiner.*